United States Patent
Yi et al.

(10) Patent No.: US 12,142,090 B2
(45) Date of Patent: Nov. 12, 2024

(54) BATTERY DIAGNOSIS APPARATUS FOR VEHICLE AND METHOD THEREOF

(71) Applicants: Hyundai Motor Company, Seoul (KR); Kia Corporation, Seoul (KR)

(72) Inventors: Jae Shin Yi, Seoul (KR); Sang Jin Park, Bucheon-si (KR); Hyun Jun Jang, Daegu (KR); Tae Kyu Kang, Seoul (KR); Byung Soo Park, Daejeon (KR); Woo Sung Kim, Suwon-si (KR); Soo Youn Park, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 215 days.

(21) Appl. No.: 17/875,007

(22) Filed: Jul. 27, 2022

(65) Prior Publication Data
US 2023/0298395 A1    Sep. 21, 2023

(30) Foreign Application Priority Data

Mar. 21, 2022 (KR) .......................... 10-2022-0034837

(51) Int. Cl.
  *G07C 5/00* (2006.01)
  *B60L 58/12* (2019.01)
  (Continued)

(52) U.S. Cl.
  CPC .............. *G07C 5/008* (2013.01); *B60L 58/12* (2019.02); *B60L 58/24* (2019.02); *G07C 5/0808* (2013.01);
  (Continued)

(58) Field of Classification Search
  CPC ..... G07C 5/008; G07C 5/0808; G07C 5/0816; B60L 58/12; B60L 58/24;
  (Continued)

(56) References Cited

U.S. PATENT DOCUMENTS 9,714,984 B2 * 7/2017 Kim .................... G01R 31/392
10,447,046 B2   10/2019 Ravi et al.
(Continued)

FOREIGN PATENT DOCUMENTS

JP          5286708 B2     9/2013
JP       2020-68639 A      4/2020
(Continued)

*Primary Examiner* — Hussein Elchanti
*Assistant Examiner* — Kenneth M Dunne
(74) *Attorney, Agent, or Firm* — Banner & Witcoff, Ltd.

(57) ABSTRACT

An apparatus for a vehicle may determine one or more abnormalities of battery cells of a battery of a vehicle and may control a normal operation by managing the one or more abnormalities. The battery diagnosis apparatus for the vehicle includes a communication device that provides a communication interface with a plurality of vehicles, and a controller that collects vehicle state information and battery state information from the plurality of vehicles, manages a maximum voltage difference change rate of battery cells for each cumulative mileage with respect to the plurality of vehicles, and diagnoses abnormalities in batteries provided in the plurality of vehicles based on the maximum voltage difference change rate of the battery cells for each cumulative mileage.

20 Claims, 8 Drawing Sheets

(51) Int. Cl.
*B60L 58/24* (2019.01)
*G07C 5/08* (2006.01)
*H01M 10/48* (2006.01)

(52) U.S. Cl.
CPC ........ *G07C 5/0816* (2013.01); *H01M 10/482* (2013.01); *H01M 10/486* (2013.01); *B60L 2240/545* (2013.01); *B60L 2240/547* (2013.01); *B60L 2240/549* (2013.01); *H01M 2220/20* (2013.01)

(58) Field of Classification Search
CPC ......... B60L 2240/545; B60L 2240/547; B60L 2240/549; H01M 10/482; H01M 10/486; H01M 2220/20
See application file for complete search history.

(56) References Cited

U.S. PATENT DOCUMENTS

| | | | |
|---|---|---|---|
| 2009/0024266 A1* | 1/2009 | Bertness | G01R 31/007 701/22 |
| 2011/0082621 A1* | 4/2011 | Berkobin | B60L 58/16 701/31.4 |
| 2013/0158776 A1* | 6/2013 | Rini | B60R 16/0234 701/29.4 |
| 2018/0345971 A1* | 12/2018 | Birnschein | B60R 16/0231 |
| 2020/0223322 A1* | 7/2020 | Seeman | B60L 3/0046 |
| 2021/0135461 A1* | 5/2021 | Wang | H01M 50/20 |
| 2022/0097561 A1* | 3/2022 | Simonis | B60L 58/16 |
| 2022/0111732 A1* | 4/2022 | He | B60L 58/10 |
| 2022/0128631 A1* | 4/2022 | Zhang | G01R 31/3835 |
| 2022/0381848 A1* | 12/2022 | Ho | G01R 31/367 |
| 2023/0011148 A1* | 1/2023 | Jeong | B60L 58/16 |
| 2023/0122362 A1* | 4/2023 | Shoa Hassani Lashidani | G01R 31/392 702/63 |

FOREIGN PATENT DOCUMENTS

| | | |
|---|---|---|
| KR | 101121095 B1 | 3/2012 |
| KR | 101692839 B1 | 1/2017 |

* cited by examiner

BATTERY DIAGNOSIS APPARATUS FOR VEHICLE AND METHOD THEREOF

CROSS-REFERENCE TO RELATED APPLICATION

This application claims the benefit of priority to Korean Patent Application No. 10-2022-0034837, filed in the Korean Intellectual Property Office on Mar. 21, 2022, the entire contents of which are incorporated herein by reference.

TECHNICAL FIELD

The present disclosure relates to a technology capable of diagnosing a state of charge (SOC) of a battery (e.g., a battery provided in each vehicle based on big data processing).

BACKGROUND

In general, an electric vehicle is a vehicle driven by electrical energy as a power source, and includes a battery composed of a plurality of battery cells for storing electrical energy.

Such battery cells convert chemical energy into electrical energy to supply electrical energy (e.g., discharge), or convert electrical energy supplied from the outside into chemical energy and store the chemical energy (e.g., charge).

Since the electric vehicle is driven by using electrical energy stored in the battery as a power source, performance of the electric vehicle may depend on performance of the battery. Accordingly, to improve the performance of the electric vehicle, it may be beneficial to manage the battery to maximize the performance of the battery.

In recent years, since battery cells with excellent performance are used to improve the power source of automobiles, and the number of battery cells is gradually increasing, the need for battery management is further required. Such battery management is generally performed by a battery management system (BMS).

The battery management system may measure cell state information such as voltage, current, and/or temperature of the battery cells from a battery module provided in the electric vehicle, and manages charging/discharging of each battery cell using the cell state information and an option value for controlling the battery cells, and performs cell balancing to maintain a balance among multiple battery cells.

The cell balancing may be one of control operations of the battery management system to keep the voltage or charge amount of the battery cells uniform. Even though each battery cell of the battery module may be manufactured under the same manufacturing conditions and the same environment, there may be differences in electrical characteristics, and there may be differences in electrical characteristics while each battery cell is mounted and operated in the electric vehicle.

Due to such difference(s) in electrical characteristics, even when the battery cells are charged and discharged with the same current, voltage imbalance or imbalance of residual charge amount between the interconnected battery cells may occur. The voltage imbalance among the battery cells or imbalance of residual charge amount may cause the available voltage range of the battery cells to be reduced or the charge and discharge cycle to be shortened.

A battery management system may diagnose whether a battery is abnormal based on a cell voltage difference and an insulation resistance of a battery provided in a vehicle. In detail, a battery management system may determine whether or not the battery is abnormal based on the sensor data at the time of diagnosis and the diagnosis conditions. In this case, it may be difficult to set the diagnosis conditions, and there may be a problem in that it may be difficult or impossible to effectively diagnose a battery defect that can cause a fatal event (e.g., fire, explosion, etc.) under the conventional diagnostic conditions.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An apparatus (e.g., a battery diagnosis apparatus) may comprise: a communication device configured to communicate with a plurality of vehicles; and a controller. The controller may be configured to: receive, from each of the plurality of vehicles, vehicle state information and battery state information; determine a voltage difference change rate associated with battery cells for each vehicle of the plurality of vehicles; and diagnose, based on the voltage difference change rate, one or more abnormalities in each battery of batteries of the plurality of vehicles.

An apparatus (e.g., a battery diagnosis apparatus for a vehicle) may comprise: a communication device configured to communicate with a server; and a controller. The controller may be configured to: receive, from the server, a reference voltage difference change rate associated with battery cells that corresponds to a cumulative mileage of a vehicle; determine a voltage difference change rate associated with battery cells of the vehicle; and diagnose, based on the reference voltage difference change rate and the determined voltage difference change rate, an abnormality in the battery cells of the vehicle.

A battery diagnosis method may comprise: receiving, from each of a plurality of vehicles, vehicle state information and battery state information; determining, by a controller, a voltage difference change rate associated with battery cells for each vehicle of the plurality of vehicles; and diagnosing, based on the voltage difference change rate, one or more abnormalities in each battery of batteries of the plurality of vehicles.

An apparatus (e.g., a battery diagnosis apparatus) may comprise: a communication device configured to communicate with a plurality of vehicles; and a controller. The controller may be configured to: receive, from each of the plurality of vehicles, battery state information; determine, based on the battery state information, a plurality of voltage difference change rates associated with battery cells of the plurality of vehicles; and detect, based on the plurality of voltage difference change rates, an abnormality in battery cells of a vehicle of the plurality of vehicles.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
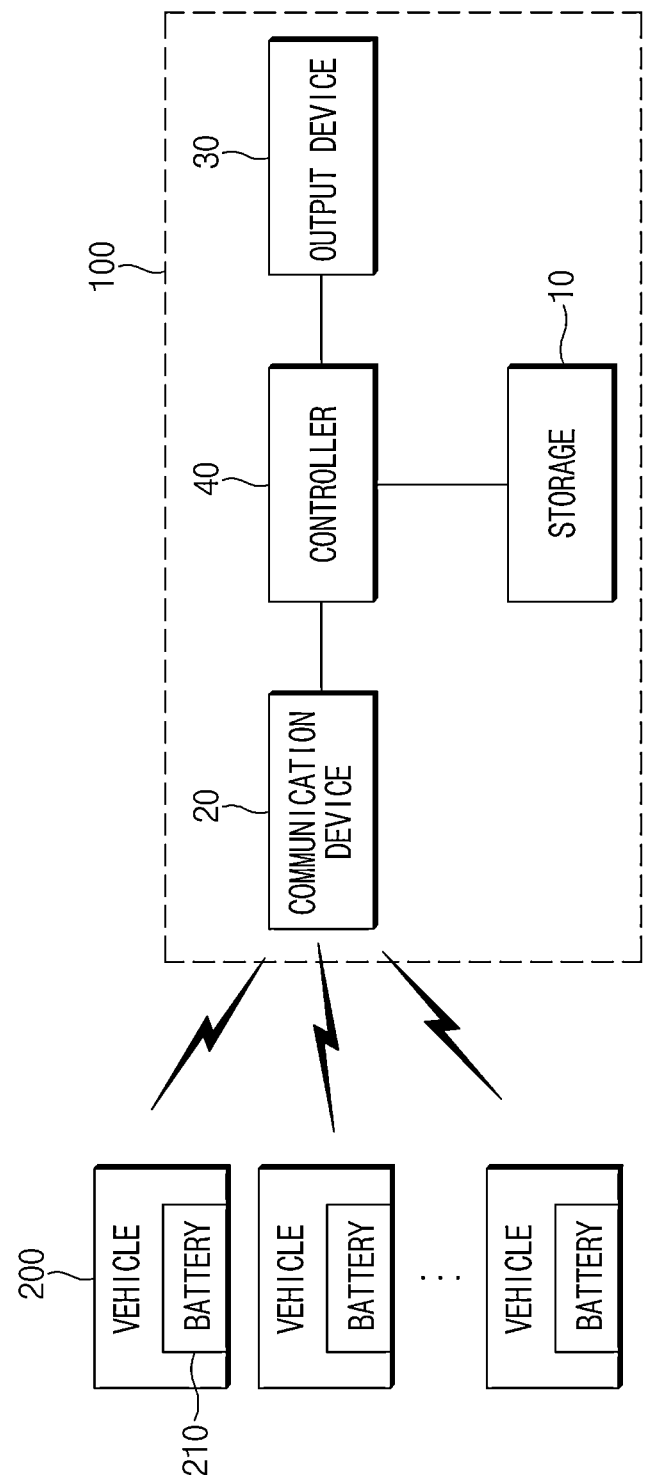
FIG. 1 is an example diagram illustrating a configuration of a battery diagnosis apparatus for a vehicle.

Hereinafter, some embodiments of the present disclosure will be described in detail with reference to the drawings. In adding the reference numerals to the components of each drawing, it should be noted that the identical or equivalent component may be designated by the identical numeral even when they are displayed on other drawings. Further, in describing the embodiment(s) of the present disclosure, a detailed description of the related known configuration or function may be omitted when it is determined that it interferes with the understanding of the embodiment(s) of the present disclosure.

In describing the components of the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same or similar meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an example diagram illustrating a configuration of a battery diagnosis apparatus for a vehicle, and may be implemented in the form of a server, as an example.

As illustrated in FIG. 1, a battery diagnosis apparatus 100 for a vehicle may include storage 10, a communication device 20, an output device 30, and a controller 40. In this case, according to a method of implementing the battery diagnosis apparatus 100 for a vehicle, each component may be combined with each other to be implemented as one, or some components may be omitted. Each of the components shown in FIG. 1 and other figures may further include subcomponents, such as a processor, volatile memory, non-volatile memory, an input device, an output device, a bus, etc.

The storage 10 may store various logics, algorithms, instructions, and/or programs required in the processes of collecting vehicle state information and battery state information from a plurality of vehicles 200, for managing (e.g., monitoring, determining, etc.) a voltage difference change rate of battery cells (e.g., a maximum voltage difference change rate among battery cells) at each mileage measurement (e.g., at regular intervals of distance traveled) with respect to each vehicle 200, and diagnosing abnormality in a battery 210 provided in the respective vehicle 200 based on the voltage difference change rate of the battery cells at each cumulative mileage measurement. The battery 210 may be one or more rechargeable batteries, each consisting of one or more battery cells. The battery 210 may include, for example, one or more of a lithium-ion battery, a lithium polymer battery, a nickel-cadmium battery, a nickel metal hydride battery, etc.

A voltage difference among different battery cells of a battery may be measured and/or determined. The voltage difference may be a difference between a voltage of a first battery cell of the battery and a second battery cell of the battery. For example, if the battery includes a plurality of battery cells (e.g., five battery cells or any other number of battery cells), the voltage difference may be a difference between a voltage of a battery cell and a voltage of another battery cell. The maximum voltage difference may be a voltage difference between a voltage of a battery cell having the highest voltage (e.g., cell #2=4.4V) and a voltage of a battery cell having the lowest voltage (e.g., cell #5=4.0V), for example, if the battery includes a plurality of battery cells (e.g., voltage of cell #1=4.2V; voltage of cell #2=4.4V; voltage of cell #3=4.2V; voltage of cell #4=4.2V; voltage of cell #5=4.0V).

The voltage difference may be measured as a difference between a voltage of a target battery cell and a reference voltage of the battery (e.g., an average voltage of the battery cells of the battery, an average voltage of cells with similar battery use period, etc.). For example, the target battery cell may be each of the plurality of cells (e.g., cell #1 to cell #5). The reference voltage may be the average voltage of the battery cells (e.g., (4.2V+4.4V+4.2V+4.2V+4.0V)/5=4.2V). The voltage difference may be 0V, for example, if the target battery cell is cell #1, cell #3, or cell #4. The voltage difference may be 0.2V, for example, if the target battery cell is cell #2. The voltage difference may be −0.2V, for example, if the target battery cell is cell #5. The voltage difference among the battery cells may be determined as 0.2V (e.g., taking the absolute value of 0.2V or −0.2V measured from cell #2 and cell #5, respectively). The average voltage of cells with similar battery use period (e.g., 10,000 miles) may be determined from server data (e.g., the average voltage of battery cells after using the battery for operating a vehicle for 10,000 miles). Other various methods may be used to determine a voltage difference among battery cells.

Figure 2:
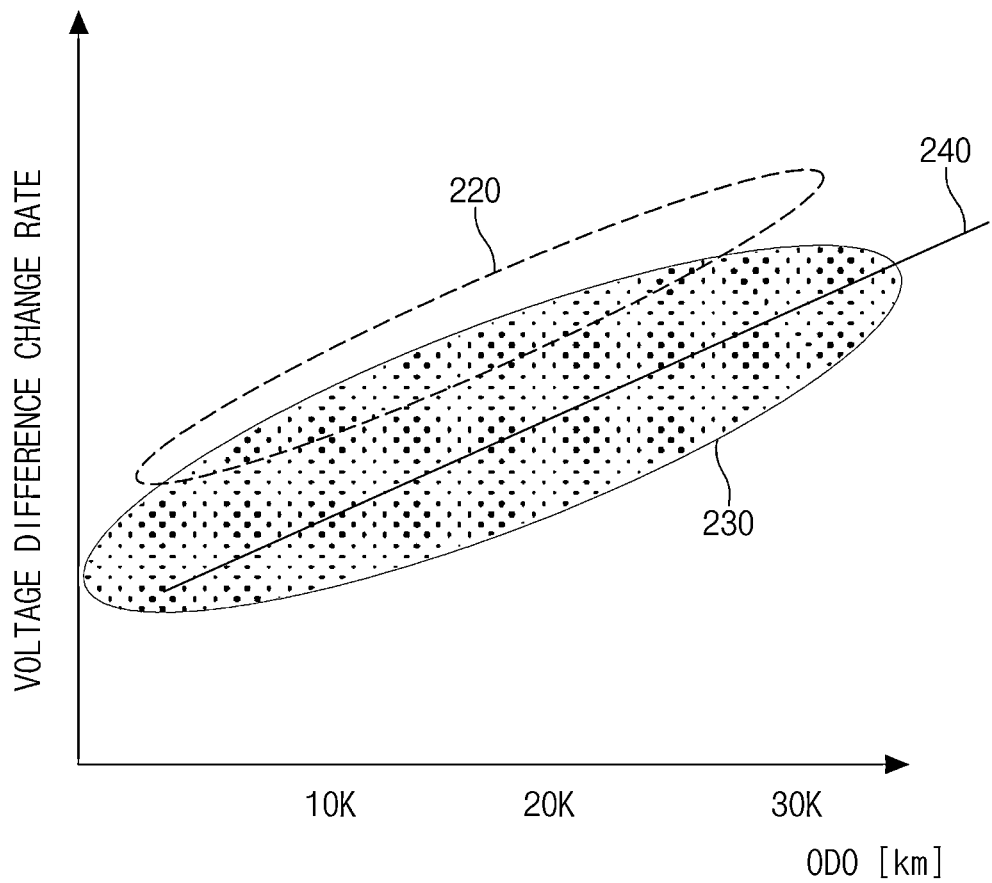
FIG. 2 is an example diagram illustrating a distribution of maximum voltage difference change rates of battery cells with respect to cumulative mileage, as stored by storage provided in the battery diagnosis apparatus for a vehicle.

The storage 10 may store data for a distribution map (e.g., a distribution graph), in which the (e.g., maximum) voltage difference change rates of the battery cells are plotted against different mileage values of each vehicle 200 generated by the controller 40 is recorded. For example, the distribution map may be the distribution map as illustrated in FIG. 2. The storage 10 may store the distribution map as numerical data sets (e.g., ordered pairs or mileage values and maximum voltage difference change rate values) that plot maximum voltage difference change rate data respectively to accumulative mileages instead of a graphical representation as illustrated in FIG. 2). Throughout the present disclosure, the term "mileage" (also referred to as "cumulative mileage") may refer to a total or cumulative distance (e.g., length) traveled by a vehicle in its lifetime, such as between the time of manufacture (or alternatively the time of last battery replacement) and the time of measurement (e.g., the "current" time). The mileage may correspond to an odometer reading. The mileage may be measured in miles, kilometers, or any other measurement units of length. For example, if a new battery is installed after 50,000 km use of a vehicle, the effective cumulative mileage for the new battery may correspond to 0 km on the distribution map.

FIG. 2 is an example diagram illustrating a distribution of maximum voltage difference change rates of battery cells against cumulative mileage, as stored by storage provided in the battery diagnosis apparatus for a vehicle. As further explained below, a voltage difference change rate may be a difference between a first voltage difference among battery cells at a first measurement and a second voltage difference among battery cells at a second measurement. The first measurement may be performed when the cumulative mileage of the vehicle corresponds to a first mileage. The second measurement may be performed when the cumulative mileage of the vehicle corresponds to a second mileage. The difference between the second mileage and the first mileage may be based on a measurement frequency. The maximum voltage difference change rate may be a difference between a first maximum voltage difference among battery cells at a first measurement and a second maximum voltage difference among battery cells at a second measurement.

As illustrated in FIG. 2, a vertical axis may represent maximum voltage difference change rates of the battery cells, and a horizontal axis may represent the cumulative mileages (e.g., total driving distances) recorded by an odometer of the vehicle 200. The cumulative mileage may be divided into a plurality of sections for efficient data processing. For example, a first section may be set to 0 km to 20 km, a second section may be set to 20 km to 40 km, and a third section may be set to 40 km to 60 km. In this way, up to an n-th section may be defined. Although the distance is presented in kilometers in this example, the distance may be measured and/or represented in other units as well, including miles. The duration of each section may be differently set (e.g., 1 km, 10 km, 20 km, etc.). The duration of each section may be determined based on the measurement frequency.

In FIG. 2, a reference number 230 may represent a distribution of the maximum voltage difference change rates of the battery cells measured at different mileage values for each vehicle 200, and a reference number 220 may indicate an abnormal distribution of the maximum voltage difference change rates of the battery cells against mileage measurements. That is, a vehicle whose maximum voltage difference change rates are distributed in a region of the reference number 220 may be classified as having an abnormality in its battery 210. The abnormality may be determined based on an updated data set of a server (e.g., a big data server). The data set and the abnormality detection algorithms may be updated, for example, based on various schemes (e.g., data regression, artificial intelligence algorithms, machine learning algorithms, deep learning algorithms, supervised and/or unsupervised learning schemes, etc.).

The storage 10 may include at least one type of storage medium of a memory such as a flash memory type, a hard disk type, a micro type, a card type (e.g., an SD card (Secure Digital Card) or an XD card (eXtream Digital Card)), a solid-state memory type (e.g., a solid-state drive (SSD)), and/or a memory such as a cache memory, a RAM (Random Access Memory), an SRAM (Static RAM), a ROM (Read-Only Memory), a PROM (Programmable ROM), an EEPROM (Electrically Erasable PROM), an MRAM (magnetic RAM), a magnetic disk, and optical disk type memory.

The communication device 20 may be a module that provides a communication interface with telematics terminals (not illustrated) provided in the plurality of vehicles 200, and may receive the vehicle state information and the battery state information from the telematics terminals. The communication device 20 may include at least one of a mobile communication module, a wireless Internet module, a short-range communication module, an antenna, a receiver, a transmitter, a transceiver, an wireless communication modem, a wired communication interface, etc.

The mobile communication module may communicate with the telematics terminals through a mobile communication network established based on technology standards or communication methods (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), 5G NR (New Radio), and/or the like) for mobile communication.

The wireless Internet module may be a module for wireless Internet access, and may communicate with the telematics terminals through WLAN (Wireless LAN), Wi-Fi, Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), an LTE (Long Term Evolution), LTE-A (Long Term Evolution-Advanced), 5G NR (New Radio), and/or the like. For example, the wireless Internet module may include a network interface card (NIC), a modem, a router, a switch, a gateway, an access point (AP), and/or an antenna.

The short-range communication module may support short-range communication with the telematics terminals using at least one of Bluetooth™, RFID (Radio Frequency Identification), IrDA (Infrared Data Association), UWB (Ultra Wideband), ZigBee, NFC (Near Field Communication), and/or Wireless USB (Wireless Universal Serial Bus).

The output device 30 may be a module for warning of abnormalities in the battery 210 provided in each vehicle 200, and may include a visual warning module (e.g., a display, a screen, a touchscreen, a monitor, a printer, etc.) and an audible warning module (e.g., a speaker, etc.).

The controller 40 may perform overall control such that each of the components may perform their functions normally. The controller 40 may be implemented in the form of hardware (e.g., processor, memory, etc.), or may be implemented in the form of software (e.g., firmware, application, etc.), or may be implemented in the form of a combination of hardware and software. The controller 40 may be implemented as a microprocessor, but is not limited thereto. For example, the controller 40 may include at least one of a central processing unit (CPU), a graphics processing unit (GPU), a field-programmable gate array (FPGA), an application specific integrated circuit (ASIC), a system-on-chip, etc.

In particular, the controller 40 may perform various controls required in the processes of collecting vehicle state information and battery state information from the plurality of vehicles 200, managing a maximum voltage difference change rate of battery cells at each cumulative mileage measurement with respect to each vehicle 200, and diagnosing abnormality in the battery 210 provided in each vehicle 200 based on the maximum voltage difference change rates of the battery cells at different cumulative mileage measurements.

Hereinafter, an operation of the controller 40 will be described in detail.

The controller 40 may collect vehicle state information and battery state information from the plurality of vehicles 200 through the communication device 20. The vehicle state information may include information regarding one or more of charging, parking, driving, cumulative mileage, etc., and the battery state information may include information regarding one or more of voltage, current, temperature, etc. of battery cells.

The controller 40 may determine the maximum voltage difference change rate of the battery cells according to the driving distance (e.g., cumulative driving distance) based on the vehicle state information and the battery state information collected from the plurality of vehicles 200.

For example, when the maximum voltage of the battery cells (e.g., the voltage of a battery cell that has the highest voltage level among all the battery cells) is $V_{max1}$ and the minimum voltage (e.g., the voltage of a battery cell that has the lowest voltage level among all the battery cells) is $V_{min1}$ in a state (e.g., at a first time) in which the cumulative mileage (e.g., aggregate distance traveled) of a first vehicle is 1,000 km, the maximum voltage difference may be represented as $V_{diff1}$ ($=V_{max1}-V_{min1}$). When the maximum voltage of the battery cells (e.g., the voltage of a battery cell that has the highest voltage level among all the battery cells) is $V_{max2}$ and the minimum voltage (e.g., the voltage of a battery cell that has the lowest voltage level among all the battery cells) is $V_{min2}$ in a state (e.g., at a second time) in which the cumulative mileage (e.g., aggregate distance traveled) of the first vehicle is 1,100 km, the maximum voltage difference may be represented as $V_{diff2}$ ($=V_{max2}-V_{min2}$). The controller 40 may determine a maximum voltage difference change rate R of the battery cells relative to the mileage based on the following [Equation 1].

$$R = \frac{v_{diff2} - v_{diff1}}{ODO_2 - ODO_1} \quad \text{[Equation 1]}$$

In this case, $ODO_1$ may represent the previous cumulative mileage (e.g., the cumulative mileage measured at the time associated with $V_{diff1}$), and $ODO_2$ may represent the current cumulative mileage (e.g., the cumulative mileage measured at the time associated with $V_{diff2}$). Accordingly, the result of subtracting $ODO_1$ from $ODO_2$ may represent the distance traveled by the first vehicle between the time associated with $V_{diff1}$ and the time associated with $V_{diff2}$. The R value may also be calculated by taking a derivative of the maximum voltage V value with respect to the mileage value ODO.

The controller 40 may manage the voltage difference change rate (e.g., the maximum voltage difference change rate) of the battery cells for each cumulative mileage for each vehicle 200. In the above example, the controller 40 may determine the R value when the cumulative mileage of the first vehicle is 1,100 km, and the coordinates (e.g., an ordered pair) of the first vehicle recorded in a distribution map 230 of FIG. 2 may be (1100, R).

The controller 40 may diagnose any abnormality of the battery 210 provided in each vehicle 200 based on the (e.g., maximum) voltage difference change rate of the battery cells for each cumulative mileage of each vehicle 200. That is, the controller 40 may calculate a standard deviation σ from the distribution map 230 of FIG. 2, and the controller 40 may determine that a vehicle included in the distribution 220 of voltage difference change rates of the battery cells against cumulative mileage has an abnormality in the battery 210 when it deviates by more than a reference value (e.g., 5σ) from a center line 240 (e.g., associated with the calculated standard deviation of σ) of the distribution map 230 of FIG. 2. As an example, FIG. 3A illustrates a maximum voltage difference of the battery cells for each date of the vehicle included in the normal distribution map 230 (e.g., the voltage difference does not change drastically over time), and FIG. 3B illustrates a maximum voltage difference of the battery cells for each date of the vehicle included in the abnormal distribution map 220 (e.g., the voltage difference changes drastically over time).

Figure 3A:
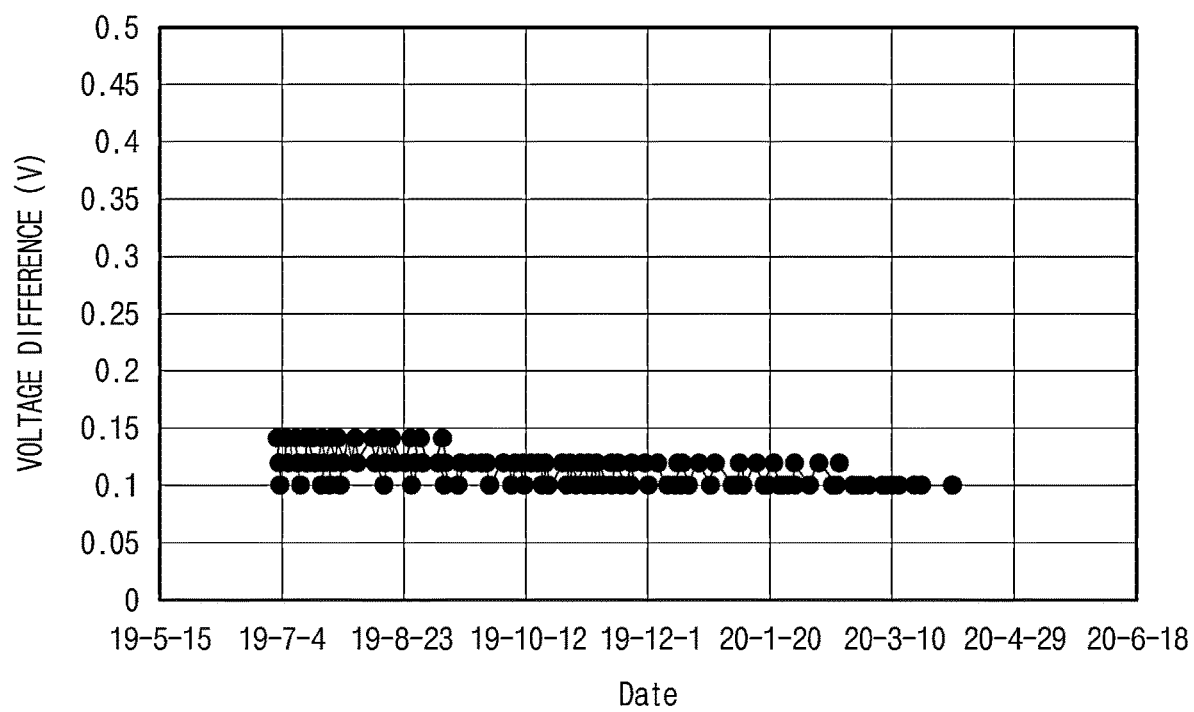
FIG. 3A is an example diagram illustrating a maximum voltage difference of battery cells for each date of a vehicle determined as normal by a controller provided in a battery diagnosis apparatus for a vehicle.
Figure 3B:
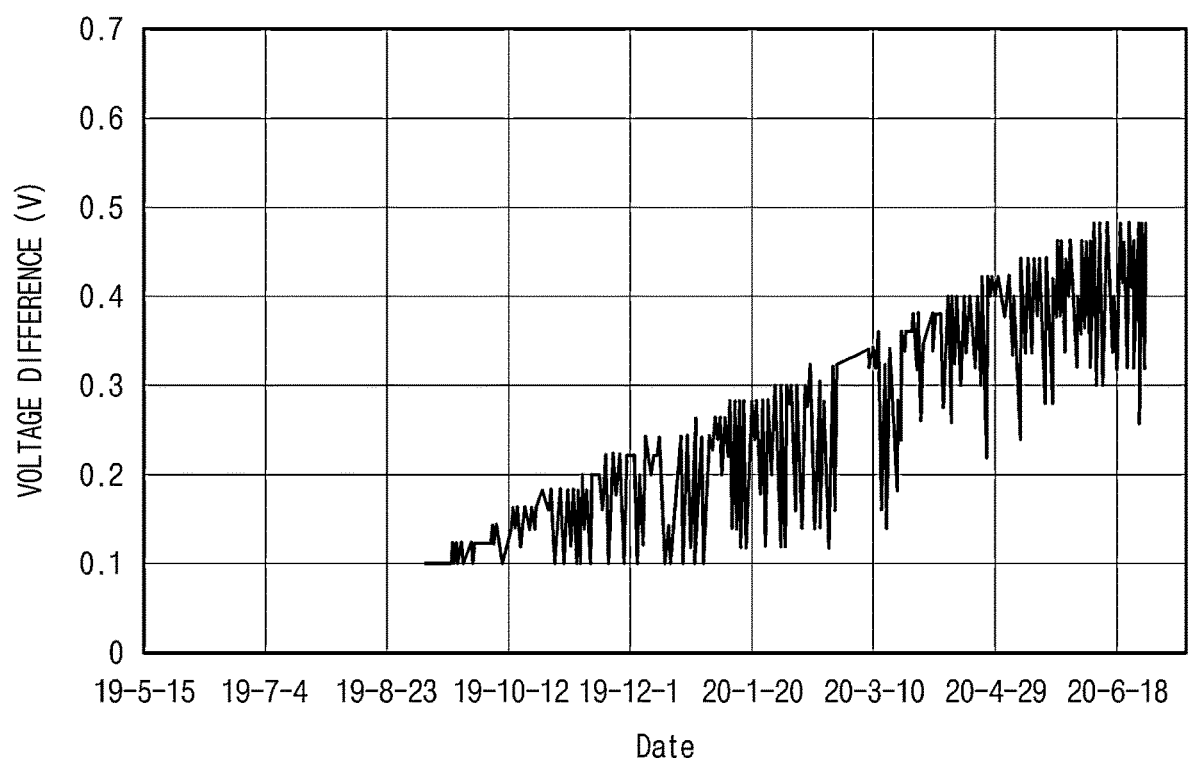
FIG. 3B is an example diagram illustrating a maximum voltage difference of battery cells for each date of a vehicle determined as abnormal by a controller provided in a battery diagnosis apparatus for a vehicle.

As illustrated in FIG. 3A, it may be seen that the maximum voltage difference of the battery cells of the normal vehicle for each date maintains a specific range. In contrast, as illustrated in FIG. 3B, it may be seen that the maximum voltage difference of the battery cells of the abnormal vehicle for each date increases rapidly.

The controller 40 may perform a diagnosis process of the battery 210 when the state of charge (SOC) of the battery 210 satisfies a reference range (e.g., 20% to 100%), and a temperature of the battery 210 satisfies a reference range (e.g., 10° C. to 50° C.), and/or a current of the battery 210 satisfies a reference range (e.g., −100 A to 100 A).

The controller 40 may perform the diagnosis process of the battery 210 when at least one element (e.g., SOC, temperature, or current) of the battery 210 satisfies its relevant reference range (e.g., 20% to 100%, 10° C. to 50° C., or −100 A to 100 A).

The controller 40 may perform the diagnosis process of the battery 210 when the travel distance of the vehicle 200 since the last diagnosis exceeds a reference distance (e.g., 1,000 km). For example, when the controller 40 performs the diagnosis process at the cumulative mileage of the vehicle 200 at 30,000 km, the next diagnosis process may be performed at 31,000 km. Alternatively, the controller 40 may perform the diagnosis periodically (e.g., once every three months, once a year, etc.)

Figure 4:
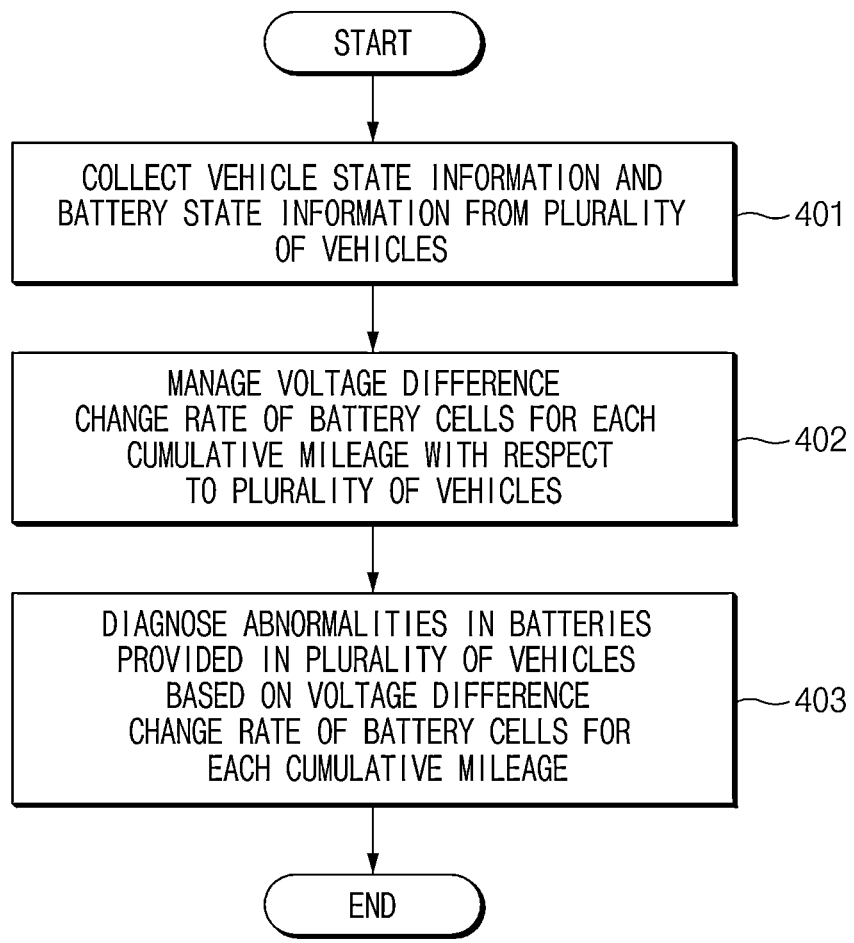
FIG. 4 is an example flowchart describing a battery diagnosis method for a vehicle.

FIG. 4 is an example flowchart for describing a battery diagnosis method for a vehicle. The methods disclosed herein, or one or more operations of the methods, may be performed by one or more computing devices or entities. The methods or one or more steps thereof may be embodied in computer-executable instructions that are stored in a computer-readable medium, such as a non-transitory computer readable medium. The steps in this flowchart and any other flowcharts disclosed herein need not all be performed in the order specified and some steps may be added, combined, omitted, or changed in order.

First, the controller 40 may collect vehicle state information and battery state information from the plurality of vehicles 200 (401).

The controller 40 may manage (e.g., monitor, determine, etc.) a maximum voltage difference change rate of the battery cells at each mileage measurement with respect to the plurality of vehicles 200 (402). The controller 40 may determine the maximum voltage difference change rate of the battery cells at each mileage measurement by using the vehicle state information and the battery state information (e.g., the controller 40 may determine a difference between the maximum voltage and the minimum voltage of the battery cells at a current time as the maximum voltage difference). The maximum voltage difference at a previous time (e.g., the last time of measurement) may also be determined in the same manner. Accordingly, the controller 40 may divide a difference, between the maximum voltage difference at the current time and the maximum voltage difference at the previous time, by the difference between the cumulative mileage at the current time and the cumulative mileage at the previous time. The result of this division may be considered the maximum voltage difference change rate of the battery cells corresponding to the cumulative mileage at the current time.

The controller 40 may diagnose any abnormalities in the batteries 210 provided in the plurality of vehicles 200 based on the maximum voltage difference change rate of the battery cells with respect to cumulative mileage (403).

Figure 5:
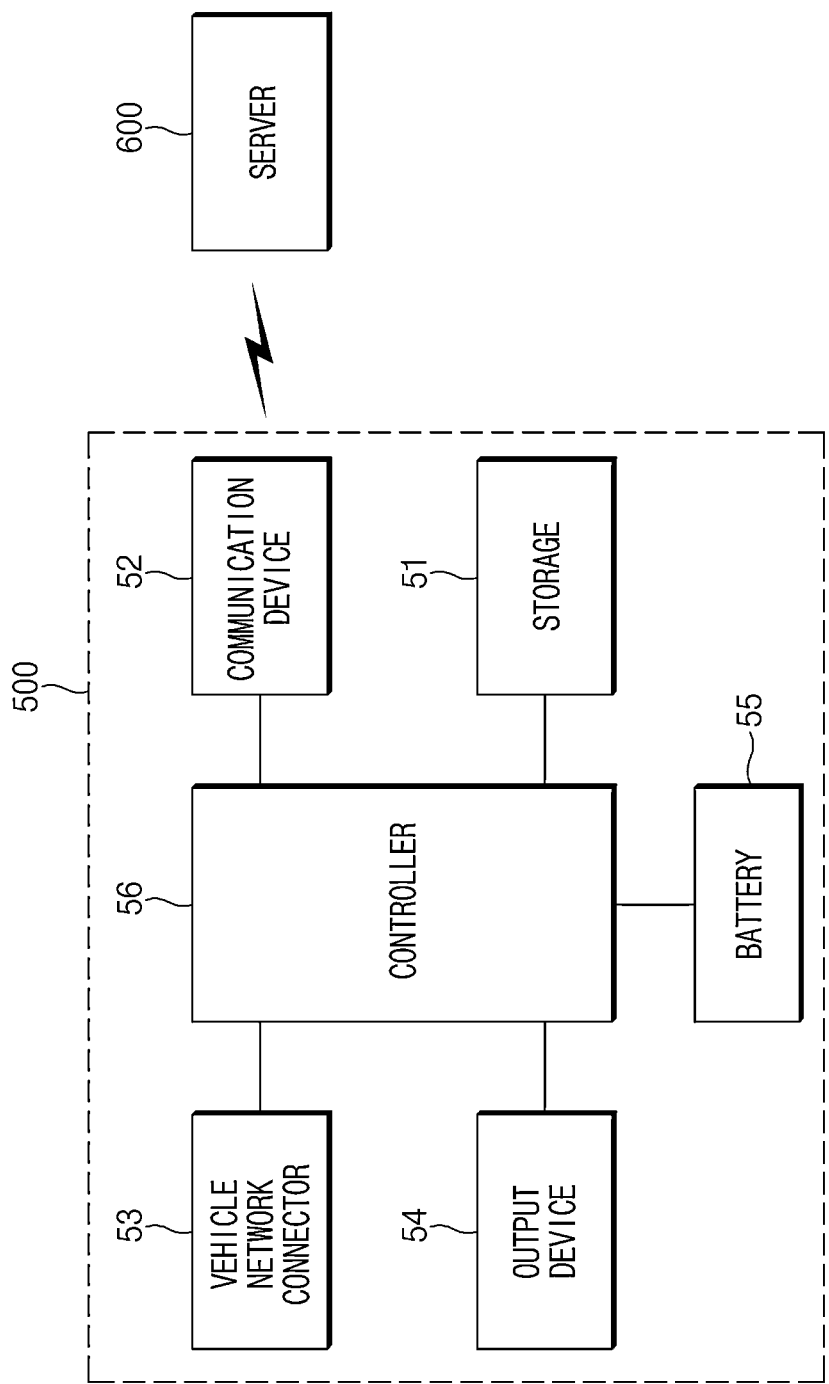
FIG. 5 is an example diagram illustrating a configuration of a battery diagnosis apparatus for a vehicle.

FIG. 5 is an example diagram illustrating a configuration of a battery diagnosis apparatus for a vehicle, and the battery diagnosis apparatus may be provided in each vehicle.

As illustrated in FIG. 5, a battery diagnosis apparatus 500 for a vehicle may include storage 51, a communication device 52, a vehicle network connector 53, an output device 54, a battery 55, and/or a controller 56. In the battery diagnosis apparatus 500 for a vehicle, each component may be combined with each other to be implemented as one, and/or some components may be omitted.

The storage 51 may store various logics, algorithms, and programs required in the processes of receiving a maximum voltage difference change rate of battery cells for each cumulative mileage from a server 600 (e.g., a big data server), determining a maximum voltage difference change rate of the battery cells depending on a cumulative mileage of the vehicle, and diagnosing an abnormality in the battery 55 provided in the vehicle based on the maximum voltage difference change rate of the battery cells with respect to cumulative mileage. The server 600 may receive vehicle state information and battery state information from a plurality of vehicles, and may manage (e.g., determine, monitor, etc.) the maximum voltage difference change rate of the battery cells with respect to cumulative mileage generated based on the vehicle state information and the battery state information. The vehicle state information may include, for example, mileage values (e.g., odometer readings). The battery state information may include, for example, voltage, amperage, state of charge, temperature, etc.

The storage 51 may store a distribution map (e.g., a distribution graph or distribution data sets), in which the maximum voltage difference change rates of the battery cells with respect to cumulative mileage received from the server 600 are recorded. The distribution map may be, for example, the distribution map (or its equivalent data set) as illustrated in FIG. 2.

The storage 51 may include at least one type of a storage medium or memory such as a flash memory type, a hard disk type, a micro type, and a card type (e.g., an SD card (Secure Digital Card) or an XD card (eXtream Digital Card)), and a memory such as a RAM (Random Access Memory), an SRAM (Static RAM), a ROM (Read-Only Memory), a PROM (Programmable ROM), an EEPROM (Electrically Erasable PROM), an MRAM (magnetic RAM), a magnetic disk, a solid-state memory (e.g., an SSD), and/or optical disk type memory.

The communication device 52 may be a module that provides a communication interface with the server 600, and may transmit the vehicle state information and the battery state information to the server 600, and may receive the maximum voltage difference change rates of the battery cells with respect to cumulative mileage from the server 600. The communication device 52 may include at least one or more of a mobile communication module, a wireless Internet module, and/or a short-range communication module as described herein.

The mobile communication module may communicate with the server 600 through a mobile communication network constructed based on technology standards or communication methods (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), 5G NR (New Radio), and/or the like) for mobile communication.

The wireless Internet module may be a module for wireless Internet access, and may communicate with the server 600 through WLAN (Wireless LAN), Wi-Fi, Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), 5G NR (New Radio), and/or the like.

The short-range communication module may support short-range communication with the server 600 using at least one of technologies of Bluetooth™, RFID (Radio Frequency Identification), IrDA (Infrared Data Association), a UWB (Ultra Wideband), ZigBee, NFC (Near Field Communication), Wireless USB (Wireless Universal Serial Bus).

The vehicle network connector device 53 may comprise a module that provides a connection interface with the vehicle network, and may include a Controller Area Network (CAN), a Controller Area Network with a Flexible Data-rate (CAN FD), a Local Interconnect Network (LIN), a FlexRay, a Media Oriented Systems Transport (MOST), an Ethernet, and/or the like.

The output device 54 may comprise a module for warning of abnormalities in the battery 55, and may include a visual warning module (e.g., a display, a screen, a touchscreen, a monitor, a printer, etc.) and/or an audible warning module (e.g., a speaker).

The battery 55 may include a high-voltage battery that provides driving power of the electric vehicle and a low-voltage battery that supplies power to electrical equipment loads. The battery 55 may include one or more battery cells.

The controller 56 may perform overall control such that each of the components may perform their functions normally. The controller 56 may be implemented in the form of hardware (e.g., a processor, memory, etc.), or may be implemented in the form of software (e.g., firmware, application, etc.), or may be implemented in the form of a combination of hardware and software. Preferably, the controller 56 may be implemented as a microprocessor, but is not limited thereto. For example, the controller 56 may include at least one of a central processing unit (CPU), a graphics processing unit (GPU), a field-programmable gate array (FPGA), an application specific integrated circuit (ASIC), a system on chip (SOC), etc.

The controller 56 may perform various controls required in the processes of receiving a maximum voltage difference change rate of battery cells for each cumulative mileage from the server 600, determining a maximum voltage difference change rate of the battery cells with respect to cumulative mileage of the vehicle, and diagnosing any abnormality in the battery 55 provided in the vehicle based on the maximum voltage difference change rate of the battery cells for each cumulative mileage.

Hereinafter, an operation of the controller 56 will be described in detail. For reference, the controller 56 may perform the same function of the controller 40 as described herein.

The controller 56 may receive vehicle state information and battery state information (e.g., via the vehicle network connector 53), and may transmit the vehicle state information and the battery state information to the server 600 (e.g., via the communication device 52). In this case, the vehicle state information may be related to charging, parking, driving, and/or cumulative mileage, and the battery state information may be related to voltage, current, state of charge, and/or temperature of battery cells.

The controller 56 may determine the maximum voltage difference change rates of the battery cells depending with respect to cumulative mileage of the vehicle based on the vehicle state information and further based on the battery state information received via the vehicle network connector 53.

The controller 56 may diagnose any abnormality present in the battery 55 provided in the vehicle based on the maximum voltage difference change rates of the battery cells with respect to cumulative mileage.

The controller 56 may perform the diagnosis process of the battery 55 when the SOC of the battery 55 satisfies a reference range (e.g., 20% to 100%), when a temperature of the battery 55 satisfies the reference range (e.g., 10° C. to 50° C.), and/or when the current of the battery 55 satisfies a reference range (e.g., −100 A to 100 A).

The controller 56 may perform the diagnosis process of the battery 55 when at least one of a case where the SOC of the battery 55 satisfies the reference range (e.g., 20% to 100%), a case where the temperature of the battery 55 satisfies the reference range (e.g., 10° C. to 50° C.), and a case where the current of the battery 55 satisfies the reference range (e.g., −100 A to 100 A) is satisfied.

The controller 56 may perform a diagnosis process of the battery 55 when the mileage of the vehicle exceeds a reference distance (e.g., 1,000 km). For example, if the controller 56 performed the diagnosis process at the cumulative mileage of the vehicle at 30,000 km, the next diagnosis process may be performed at 31,000 km. The controller 56 may perform the diagnosis process periodically (e.g., at fixed time intervals such as every three months, etc.) and/or at fixed travel distance intervals (e.g., every 1,000 km, etc.).

Figure 6:
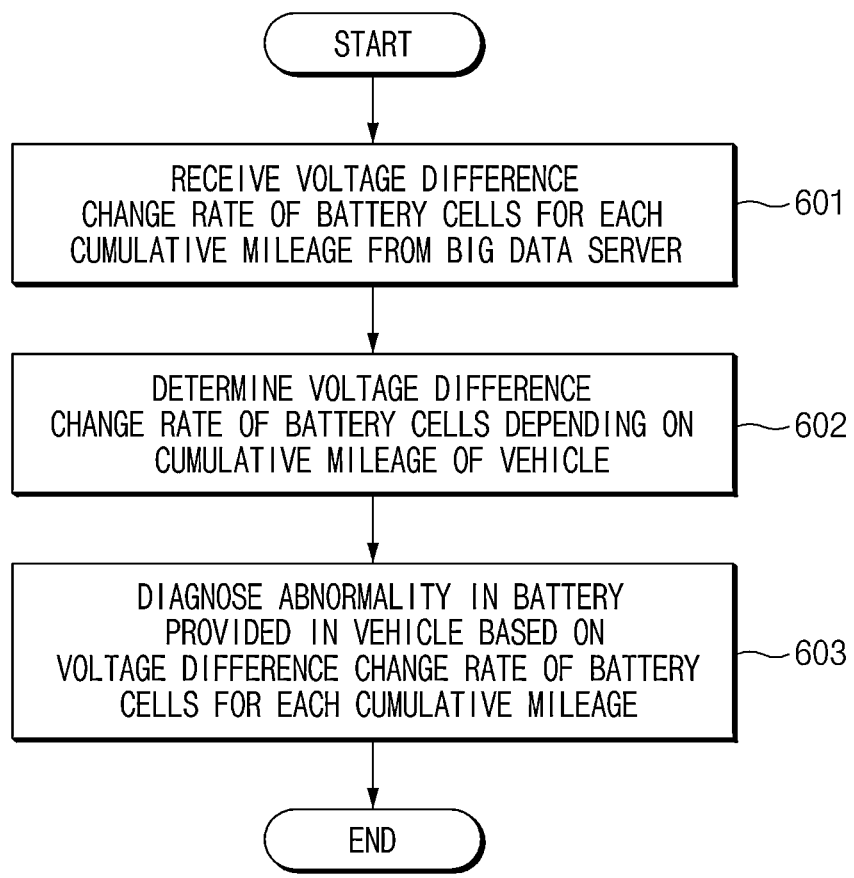
FIG. 6 is an example flowchart for describing a battery diagnosis method for a vehicle.

FIG. 6 is an example flowchart for describing a battery diagnosis method for a vehicle.

First, the controller 56 may receive the maximum voltage difference change rate(s) of the battery cells with respect to cumulative mileage from the server 600 (601). The controller 56 may store (e.g., in the storage 51) a distribution map, in which the maximum voltage difference change rate (s) of the battery cells with respect to cumulative mileage received from the server 600 is recorded.

Thereafter, the controller 56 may determine the maximum voltage difference change rate of the battery cells depending on the cumulative mileage of the vehicle (602).

Thereafter, the controller 56 may diagnose any abnormality in the battery 55 provided in the vehicle based on the maximum voltage difference change rate (s) of the battery cells with respect to cumulative mileage (603).

Figure 7:
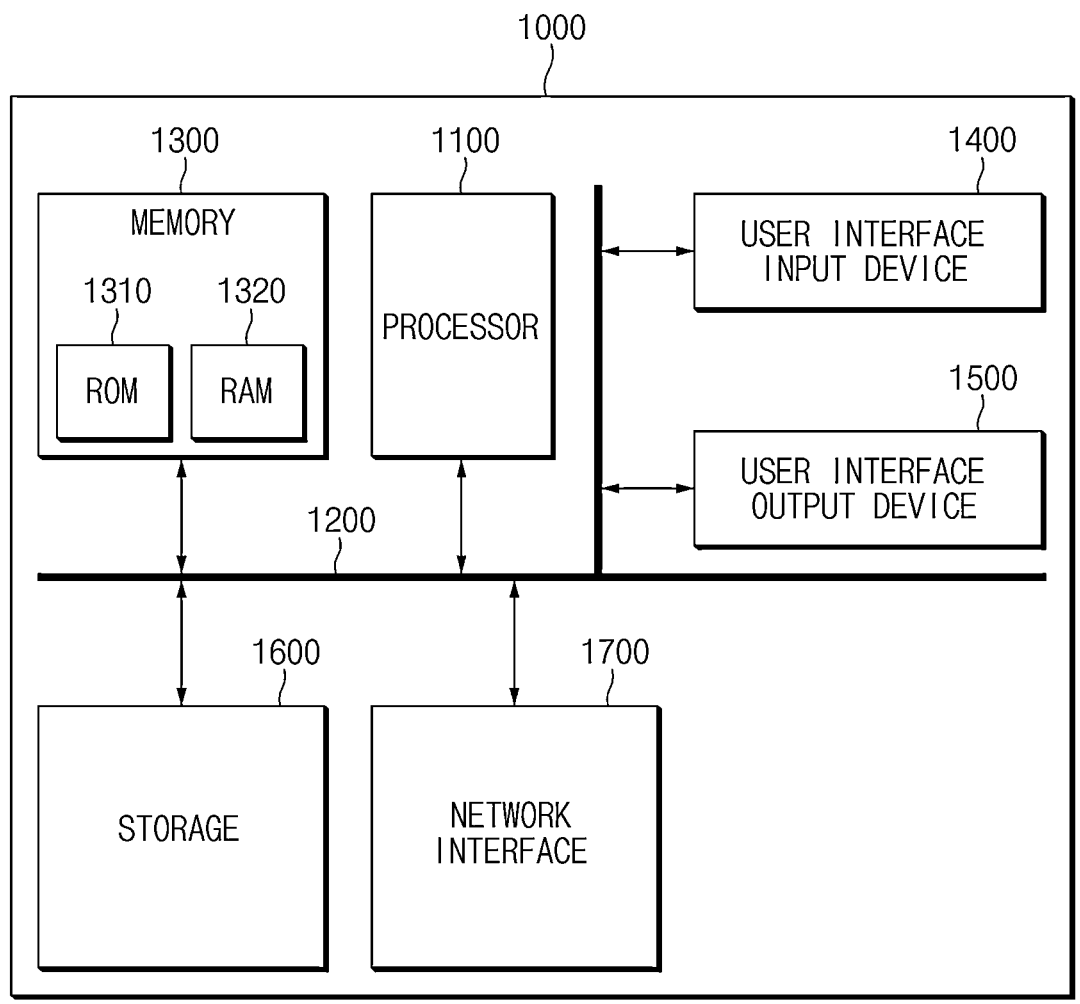
FIG. 7 is an example block diagram illustrating a computing system for executing a battery diagnosis method for a vehicle.

FIG. 7 is an example block diagram illustrating a computing system for executing a battery diagnosis method for a vehicle.

Referring to FIG. 7, a battery diagnosis method for a vehicle may be implemented through a computing system. A computing system 1000 may include at least one processor 1100, a memory 1300, a user interface input device 1400, a user interface output device 1500, storage 1600, and/or a network interface 1700, which may be connected with each other through a system bus 1200. The computing system 1000 may be used to implement one or more devices, modules, components, and/or subcomponents as described in FIGS. 1-6.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a random access memory (RAM), a flash memory, a read only memory (ROM), an erasable and programmable ROM (EPROM), an electrically EPROM (EEPROM), a register, a magnetic storage device (e.g., a hard disk drive), a solid-state memory device (e.g., a solid-state drive (SSD)), a removable disc, and/or a compact disc-ROM (CD-ROM). For example, the storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

A battery diagnosis apparatus for a vehicle and a method thereof may diagnose, in advance, a faulty battery cell (or lemon) in a battery that can cause a fire in the vehicle, by collecting vehicle state information and battery state information from the plurality of vehicles, determining a maximum voltage difference change rate of battery cells with respect to cumulative mileage of each vehicle, and diagnosing an abnormality in the offending battery in the respective vehicle based on the maximum voltage difference change rate(s) of the battery cells with respect to cumulative mileage.

An apparatus (e.g., the apparatus (s), devices, etc. described herein) may perform a method comprising multiple operations. The apparatus (e.g., a battery diagnosis apparatus) may comprise: a communication device configured to communicate with a plurality of vehicles; and a controller. The controller may be configured to: receive, from each of the plurality of vehicles, vehicle state information and battery state information; determine a voltage difference change rate associated with battery cells for each vehicle of the plurality of vehicles; and diagnose, based on the voltage difference change rate, one or more abnormalities in each battery of batteries of the plurality of vehicles. The apparatus may comprise storage configured to store data associated with a distribution map in which the voltage difference change rate is recorded, wherein the voltage difference change rate comprises a voltage difference change rate over a cumulative mileage. The vehicle state information may comprise at least one of: charging information, parking information, driving information, or cumulative mileage information. The battery state information may comprise at least one of: voltage, current, or temperature associated with the battery cells. For each vehicle of the plurality of vehicles, the controller may be configured to: determine a difference between a maximum voltage and a minimum voltage among the battery cells at a first time as a first maximum voltage difference; determine a difference between a maximum voltage and a minimum voltage among the battery cells at a second time as a second maximum voltage difference; and obtain the voltage difference change rate by dividing a difference between the second maximum voltage difference and the first maximum voltage difference by a difference between a cumulative mileage at the second time and a cumulative mileage at the first time. The voltage difference change rate may correspond to the cumulative mileage at the second time. The controller may be configured to: generate a distribution map using the voltage difference change rate for a corresponding cumulative mileage, and determine that at least one voltage difference change rate associated with at least one of the batteries of the plurality of vehicles exceeding a reference value from a center line of the distribution map is abnormal. The controller may be configured to: diagnose the batteries based on a condition comprising at least one of: a state of charge (SOC) of the batteries that satisfies a first reference range; a temperature of the batteries that satisfies a second reference range; or a current of the batteries that satisfies a third reference range. The controller may be configured to: detect an abnormality in a battery of a second vehicle of the plurality of vehicles based on a cumulative mileage of the second vehicle exceeding a reference mileage. The apparatus may also perform one or more additional operations (e.g., one or more operations described herein). The apparatus may comprise one or more processors; and memory storing instructions that, when executed by the one or more processors, cause the apparatus to perform the described method, additional operations and/or include the additional elements. A system (e.g., a vehicle) may comprise the apparatus configured to perform the described method, additional operations and/or include the additional elements; and another device components described herein. A computer-readable medium may store instructions that, when executed, cause performance of the described method, additional operations and/or include the additional elements.

An apparatus (e.g., the apparatus (s), devices, etc. described herein) may perform a method comprising multiple operations. The apparatus (e.g., a battery diagnosis apparatus for a vehicle) may comprise: a communication device configured to communicate with a server; and a controller. The controller may be configured to: receive, from the server, a reference voltage difference change rate associated with battery cells that corresponds to a cumulative mileage of a vehicle; determine a voltage difference change rate associated with battery cells of the vehicle; and diagnose, based on the reference voltage difference change rate and the determined voltage difference change rate, an abnormality in the battery cells of the vehicle. The apparatus may comprise storage configured to store data associated with a distribution map in which the reference voltage difference change rate is recorded. The controller may be configured to: collect, as vehicle state information, at least one of: charging information, parking information, driving information, or cumulative mileage information; and collect, as battery state information, at least one of: voltage, current, or temperature associated with battery cells. The controller may be configured to: determine a difference between a maximum voltage and a minimum voltage among the battery cells of the vehicle at a first time as a first maximum voltage difference; determine a difference between a maximum voltage and a minimum voltage among the battery cells of the vehicle at a second time as a second maximum voltage difference; and obtain the voltage difference change rate associated with the battery cells of the vehicle by dividing a difference between the second maximum voltage difference and the first maximum voltage difference by a difference between a cumulative mileage at the second time and a cumulative mileage at the first time. The voltage difference change rate associated with the battery cells of the vehicle may correspond to the cumulative mileage at the second time. The controller may be configured to: generate a distribution map using the reference voltage difference change rate, and determine an abnormality in the battery cells of the vehicle if the determined voltage difference change rate according to the cumulative mileage of the vehicle exceeds a reference value from a center line of the distribution map. The controller may be configured to: diagnose the battery cells of the vehicle based on a condition comprising at least one of: a state of charge (SOC) of the battery cells of the vehicle that satisfies a first reference range; a temperature of the battery cells of the vehicle that satisfies a second reference range; or a current of the battery cells of the vehicle that satisfies a third reference range. The apparatus may also perform one or more additional operations (e.g., one or more operations described herein). The apparatus may comprise one or more processors; and memory storing instructions that, when executed by the one or more processors, cause the apparatus to perform the described method, additional operations and/or include the additional elements. A system (e.g., a vehicle) may comprise the apparatus configured to perform the described method, additional operations and/or include the additional elements; and another device components described herein. A computer-readable medium may store instructions that, when executed, cause performance of the described method, additional operations and/or include the additional elements.

An apparatus (e.g., the apparatus(s), devices, etc. described herein) may perform a method comprising multiple operations. The apparatus (e.g., a battery diagnosis apparatus) may comprise: a communication device configured to communicate with a plurality of vehicles; and a controller. The controller may be configured to: receive, from each of the plurality of vehicles, battery state information; determine, based on the battery state information, a plurality of voltage difference change rates associated with battery cells of the plurality of vehicles; and detect, based on the plurality of voltage difference change rates, an abnormality in battery cells of a vehicle of the plurality of vehicles. The apparatus may also perform one or more additional operations (e.g., one or more operations described herein). The apparatus may comprise one or more processors; and memory storing instructions that, when executed by the one or more processors, cause the apparatus to perform the described method, additional operations and/or include the additional elements. A system (e.g., a vehicle) may comprise the apparatus configured to perform the described method, additional operations and/or include the additional elements; and another device components described herein. A computer-readable medium may store instructions that, when executed, cause performance of the described method, additional operations and/or include the additional elements.

An aspect of the present disclosure provides a battery diagnosis apparatus for a vehicle and a method thereof that may diagnose a fault in a battery that can cause a fire in the vehicle in advance, by collecting vehicle state information and battery state information from the plurality of vehicles, managing a maximum voltage difference change rate of battery cells for each cumulative mileage with respect to each vehicle, and diagnosing an abnormality in the battery of each vehicle based on the voltage difference change rate of the battery cells for each cumulative mileage.

The technical problems to be solved by the present disclosure are not limited to the aforementioned problems. In addition, it will be easily understood that the objects and advantages of the disclosure are realized by means and combinations described in the appended claims.

According to an aspect of the present disclosure, a battery diagnosis apparatus for a vehicle may include a communication device that provides a communication interface with a plurality of vehicles, and a controller that collects vehicle state information and battery state information from the plurality of vehicles, manages a maximum voltage difference change rate of battery cells for each cumulative mileage with respect to the plurality of vehicles, and diagnoses abnormalities in batteries provided in the plurality of vehicles based on the maximum voltage difference change rate of the battery cells for each cumulative mileage.

The battery diagnosis apparatus for the vehicle may further include storage that stores a distribution map in which the maximum voltage difference change rate of the battery cells for each cumulative mileage is recorded.

The controller may collect at least one of charging, parking, driving, and cumulative mileage as the vehicle state information, and may collect at least one of voltage, current, and temperature of the battery cells as the battery state information.

The controller may determine a difference between a maximum voltage and a minimum voltage of the battery cells at a previous time and a current time as a maximum voltage difference, and may manage a result obtained by dividing a difference between the maximum voltage difference at the current time and the maximum voltage difference at the previous time by a difference between an cumulative mileage at the current time and an cumulative mileage at the previous time as a maximum voltage difference change rate of the battery cells corresponding to the cumulative mileage at the current time.

The controller may generate a distribution map using the maximum voltage difference change rate of the battery cells for each cumulative mileage, and may determine that the batteries of the vehicles exceeding a reference value from a center line of the distribution map are abnormal.

The controller may diagnose the batteries when a state of charge (SOC) of the batteries satisfies a first reference range, a temperature of the batteries satisfies a second reference range, and a current of the batteries satisfies a third reference range.

The controller may perform the diagnosis of the batteries with respect to the vehicles of which the cumulative mileage exceeds a reference mileage.

According to an aspect of the present disclosure, a battery diagnosis method for a vehicle includes collecting, by a controller, vehicle state information and battery state information from the plurality of vehicles, managing, by the controller, a maximum voltage difference change rate of battery cells for each cumulative mileage with respect to the plurality of vehicles, and diagnosing, by the controller, abnormalities in batteries provided in the plurality of vehicles based on the maximum voltage difference change rate of the battery cells for each cumulative mileage.

The battery diagnosis method for the vehicle may further include storing, by storage, a distribution map in which the maximum voltage difference change rate of the battery cells for each cumulative mileage is recorded.

The collecting may include collecting at least one of charging, parking, driving, and cumulative mileage as the vehicle state information, and collecting at least one of voltage, current, and temperature of the battery cells as the battery state information.

The managing may include determining a difference between a maximum voltage and a minimum voltage of the battery cells at a previous time and a current time as a maximum voltage difference, and managing a result obtained by dividing a difference between a maximum voltage difference at the current time and a maximum voltage difference at the previous time by a difference between an cumulative mileage at the current time and an cumulative mileage at the previous time as a maximum voltage difference change rate of the battery cells corresponding to the cumulative mileage at the current time.

The diagnosing may include generating a distribution map using the maximum voltage difference change rate of the battery cells for each cumulative mileage, and determining that the batteries of the vehicles exceeding a reference value from a center line of the distribution map are abnormal.

The diagnosing may include determining the diagnosis of the batteries when the state of charge (SOC) of the batteries satisfies a first reference range, a temperature of the batteries satisfies a second reference range, and a current of the batteries satisfies a third reference range.

The diagnosing may include determining the diagnosis of the batteries with respect to the vehicles of which the cumulative mileage exceeds a reference mileage.

A battery diagnosis apparatus for a vehicle includes a communication device that provides a communication interface with a server, and a controller that receives a maximum voltage difference change rate of battery cells for each cumulative mileage from the server, determines a maximum voltage difference change rate of the battery cells depending on an cumulative mileage of the vehicle, and diagnoses abnormality in the battery provided in the vehicle based on the maximum voltage difference change rate of the battery cells for each cumulative mileage.

The battery diagnosis apparatus for the vehicle may further include storage that stores a distribution map in which the maximum voltage difference change rate of the battery cells for each cumulative mileage is recorded.

The controller may collect at least one of charging, parking, driving, and cumulative mileage as the vehicle state information, and may collect at least one of voltage, current, and temperature of the battery cells as the battery state information.

The controller may determine a difference between a maximum voltage and a minimum voltage of the battery cells at a previous time and a current time as a maximum voltage difference, and may determine a result obtained by dividing a difference between a maximum voltage difference at the current time and a maximum voltage difference at the previous time by a difference between an cumulative mileage at the current time and an cumulative mileage at the previous time as a maximum voltage difference change rate of the battery cells corresponding to the cumulative mileage at the current time.

The controller may generate a distribution map using the maximum voltage difference change rate of the battery cells for each cumulative mileage, and may determine that there is an abnormality in the battery when the maximum voltage difference change rate of the battery cells according to the cumulative mileage of the vehicle exceeds a reference value from a center line of the distribution map.

The controller may diagnose the battery when the state of charge (SOC) of the battery satisfies a first reference range, a temperature of the battery satisfies a second reference range, and a current of the battery satisfies a third reference range.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A battery diagnosis apparatus comprising:
   a communication device configured to communicate with a plurality of vehicles; and
   a controller configured to:
   receive, from each of the plurality of vehicles, vehicle state information and battery state information;
   identify, after receiving the vehicle state information and the battery state information from each of the plurality of vehicles, a target vehicle of the plurality of vehicles;
   identify, based on the vehicle state information of the target vehicle, a cumulative mileage of the target vehicle;
   identify, based on the vehicle state information and the battery state information of each of the plurality of vehicles, a reference voltage difference change rate associated with battery cells that corresponds to the cumulative mileage;
   determine a voltage difference change rate associated with battery cells for the target vehicle, wherein the determined voltage difference change rate corresponds to the cumulative mileage; and
   diagnose, based on the voltage difference change rate and the reference voltage difference change rate, one or more abnormalities in battery cells of at least one battery of the target vehicle; and
   cause the target vehicle to perform a normal operation by controlling the one or more abnormalities in the at least one battery of the target vehicle.

2. The battery diagnosis apparatus of claim 1, further comprising:
   storage configured to store data associated with a distribution map in which the voltage difference change rate is recorded.

3. The battery diagnosis apparatus of claim 1, wherein:
   the vehicle state information of each of the plurality of vehicles comprises at least one of: charging information, parking information, driving information, or cumulative mileage information; and
   the battery state information of each of the plurality of vehicles comprises at least one of: voltage, current, or temperature associated with battery cells.

4. The battery diagnosis apparatus of claim 1, wherein, for each vehicle of the plurality of vehicles, the controller is configured to:
   determine a difference between a maximum voltage and a minimum voltage, among battery cells of the respective vehicle of the plurality of vehicles, at a first time as a first maximum voltage difference;
   determine a difference between a maximum voltage and a minimum voltage, among the battery cells of the respective vehicle of the plurality of vehicles, at a second time as a second maximum voltage difference; and
   obtain a voltage difference change rate for the respective vehicle of the plurality of vehicles by dividing a difference between the second maximum voltage difference and the first maximum voltage difference by a difference between a cumulative mileage at the second time and a cumulative mileage at the first time, and
   wherein the voltage difference change rate for the respective vehicle of the plurality of vehicles corresponds to the cumulative mileage at the second time.

5. The battery diagnosis apparatus of claim 1, wherein the controller is configured to:
   generate a distribution map using a voltage difference change rate of each vehicle of the plurality of vehicles for a corresponding cumulative mileage, and determine that at least one voltage difference change rate associated with at least one of batteries of the plurality of vehicles exceeding a reference value from a center line of the distribution map is abnormal.

6. The battery diagnosis apparatus of claim 1, wherein the controller is configured to:
   diagnose the at least one battery, of the target vehicle, based on a condition comprising at least one of:
   a state of charge (SOC) of the at least one battery that satisfies a first reference range;
   a temperature of the at least one battery that satisfies a second reference range; or
   a current of the at least one battery that satisfies a third reference range.

7. The battery diagnosis apparatus of claim 1, wherein the controller is configured to:
   detect an abnormality in a battery of a second vehicle of the plurality of vehicles based on a cumulative mileage of the second vehicle exceeding a reference mileage.

8. A battery diagnosis method comprising:
   receiving, via a communication device from each of a plurality of vehicles, vehicle state information and battery state information;
   after receiving the vehicle state information and the battery state information from each of the plurality of vehicles, identifying, by a controller, a target vehicle of the plurality of vehicles;
   identifying, by the controller and based on the vehicle state information of the target vehicle, a cumulative mileage of the target vehicle;
   identifying, by the controller and based on the vehicle state information and the battery state information of each of the plurality of vehicles, a reference voltage difference change rate associated with battery cells that corresponds to the cumulative mileage;
   determining, by the controller, a voltage difference change rate associated with battery cells for the target vehicle, wherein the determined voltage difference change rate corresponds to the cumulative mileage;
   diagnosing, by the controller and based on the voltage difference change rate and the reference voltage difference change rate, one or more abnormalities in battery cells of at least one battery of the target vehicle; and causing, by the controller, the target vehicle to perform a normal operation by controlling the one or more abnormalities in the at least one battery of the target vehicle.

9. The battery diagnosis method of claim 8, further comprising:

storing data associated with a distribution map in which the voltage difference change rate is recorded.

10. The battery diagnosis method of claim 8, wherein:

the vehicle state information of each of the plurality of vehicles comprises at least one of:

charging information, parking information, driving information, or cumulative mileage information; and the battery state information of each of the plurality of vehicles comprises at least one of:

voltage, current, or temperature associated with battery cells.

11. The battery diagnosis method of claim 8, further comprising, for each vehicle of the plurality of vehicles:

determining, by the controller, a difference between a maximum voltage and a minimum voltage, among battery cells of the respective vehicle of the plurality of vehicles, at a first time as a first maximum voltage difference;

determining, by the controller, a difference between a maximum voltage and a minimum voltage, among battery cells of the respective vehicle of the plurality of vehicles, at a second time as a second maximum voltage difference; and obtaining a voltage difference change rate for the respective vehicle of the plurality of vehicles by dividing a difference between the second maximum voltage difference and the first maximum voltage difference by a difference between a cumulative mileage at the second time and a cumulative mileage at the first time, and wherein the voltage difference change rate for the respective vehicle of the plurality of vehicles corresponds to the cumulative mileage at the second time.

12. The battery diagnosis method of claim 8, wherein the diagnosing includes:

generating, by the controller, a distribution map using a voltage difference change rate of each vehicle of the plurality of vehicles for a corresponding cumulative mileage; and determining, by the controller, that at least one voltage difference change rate associated with at least one of batteries of the plurality of vehicles exceeding a reference value from a center line of the distribution map is abnormal.

13. The battery diagnosis method of claim 8, wherein the diagnosing includes:

diagnosing, by the controller, the at least one battery, of the target vehicle, based on a condition comprising at least one of:

a state of charge (SOC) of the at least one battery that satisfies a first reference range;

a temperature of the at least one battery that satisfies a second reference range; or a current of the at least one battery that satisfies a third reference range.

14. The battery diagnosis method of claim 8, wherein the diagnosing includes:

detecting an abnormality in a battery of a second vehicle of the plurality of vehicles based on a cumulative mileage of the second vehicle exceeding a reference mileage.

15. A vehicle comprising:

a communication device configured to communicate with a server; and a controller configured to:

receive, from the server, a reference voltage difference change rate associated with battery cells that corresponds to a cumulative mileage of the vehicle;

detect a first voltage difference among battery cells of the vehicle and a second voltage difference among the battery cells of the vehicle;

determine, based on the first voltage difference and the second voltage difference, a voltage difference change rate associated with the battery cells of the vehicle;

diagnose, based on the reference voltage difference change rate and the determined voltage difference change rate, an abnormality in the battery cells of the vehicle; and cause the vehicle to perform a normal operation by controlling the one or more abnormalities in the battery cells of the vehicle.

16. The vehicle of claim 15, further comprising:

storage configured to store data associated with a distribution map in which the reference voltage difference change rate is recorded.

17. The vehicle of claim 15, wherein the controller is configured to:

collect, as vehicle state information, at least one of:

charging information, parking information, driving information, or cumulative mileage information; and collect, as battery state information, at least one of:

voltage, current, or temperature associated with battery cells.

18. The vehicle of claim 15, wherein the controller is configured to:

determine a difference between a maximum voltage and a minimum voltage among the battery cells of the vehicle at a first time as the first voltage difference;

determine a difference between a maximum voltage and a minimum voltage among the battery cells of the vehicle at a second time as the second voltage difference; and obtain the voltage difference change rate associated with the battery cells of the vehicle by dividing a difference between the second voltage difference and the first voltage difference by a difference between a cumulative mileage at the second time and a cumulative mileage at the first time, wherein the voltage difference change rate associated with the battery cells of the vehicle corresponds to the cumulative mileage at the second time.

19. The vehicle of claim 15, wherein the controller is configured to:

generate a distribution map using the reference voltage difference change rate, and determine an abnormality in the battery cells of the vehicle, based on the determined voltage difference change rate according to the cumulative mileage of the vehicle exceeding a reference value from a center line of the distribution map.

20. The vehicle claim 15, wherein the controller is configured to:
  diagnose the battery cells of the vehicle based on a condition comprising at least one of:
    a state of charge (SOC) of the battery cells of the vehicle that satisfies a first reference range;
    a temperature of the battery cells of the vehicle that satisfies a second reference range; or
    a current of the battery cells of the vehicle that satisfies a third reference range.

* * * * *